United States Patent [19]

Schroeder et al.

[11] 4,420,352

[45] Dec. 13, 1983

[54] ABSORBABLE-SUSCEPTOR JOINING OF CERAMIC SURFACES

[75] Inventors: James E. Schroeder, Claremont; Paul J. Shlichta, San Pedro, both of Calif.

[73] Assignee: The United States of America as represented by the Administrator of the National Aeronautics and Space Administration, Washington, D.C.

[21] Appl. No.: 465,367

[22] Filed: Feb. 10, 1983

[51] Int. Cl.³ .................... C03B 29/00; C04B 33/34; C04B 37/00
[52] U.S. Cl. .................. 156/89; 156/304.3; 156/304.6; 156/81; 156/499
[58] Field of Search ............. 156/89, 272.2, 304.1, 156/304.3, 304.6, 81, 155, 252, 325, 380, 499, 583.1; 65/59 R, 154, 157; 428/627–629, 420, 432

[56] References Cited

U.S. PATENT DOCUMENTS 4,347,089 8/1982 Loehman .................. 156/89

Primary Examiner—William A. Powell
Attorney, Agent, or Firm—John R. Manning; Paul F. McCaul; Thomas H. Jones

[57] ABSTRACT

An assembly (28) of ceramic surfaces (21, 23), particularly refractory metal oxides and carbides, abutting a thin sheet (22) of metal susceptor material are placed in a chamber (10) of an enclosure (14) containing inert gas (36). An r.f. coil (24) is activated by power supply (26) to melt the susceptor (22) and adjacent zones (40, 42) of the ceramic. Reactive gas such as oxygen or a carbonizing gas (38) is then fed to the chamber (10) and reacts with the susceptor (22) to form compounds (47) which disperse and dissolve in the zones (40, 42). On cooling, a strong joint is formed. The susceptor may contain inner perforations (58) and outer perforations (56) to aid in distribution of heat.

14 Claims, 12 Drawing Figures

SUSCEPTOR REACTS
WITH ATMOSPHERE

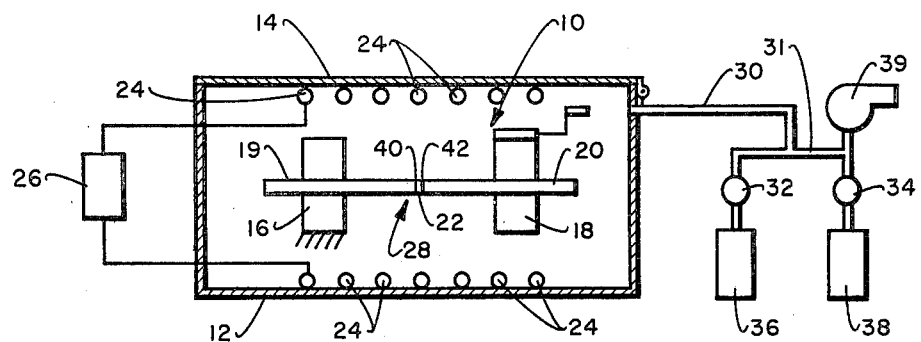
Fig. 1.
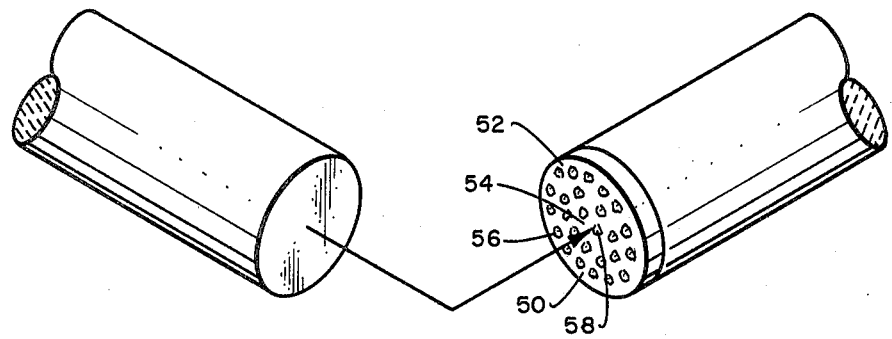
Fig. 2.
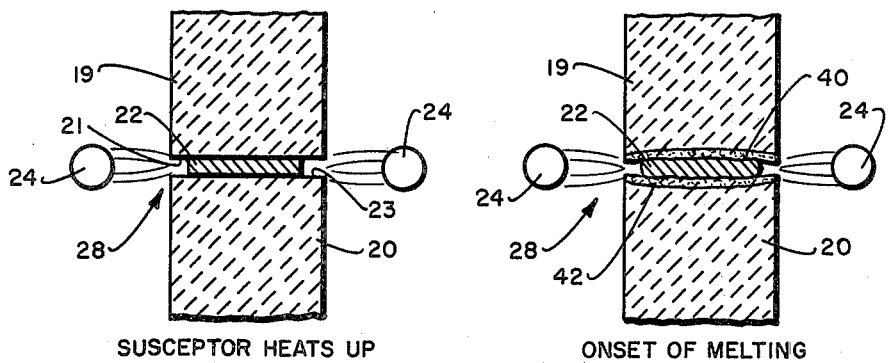
SUSCEPTOR HEATS UP
Fig. 3a.
ONSET OF MELTING
Fig. 3b.

SUSCEPTOR REACTS
WITH ATMOSPHERE

SUSCEPTOR DISPERSED
IN MOLTEN JOINT

JOINT COOLED AND
CRYSTALLIZED

SUSCEPTOR HEATS UP

ONSET OF MELTING

SUSCEPTOR REACTS
WITH ATMOSPHERE

SUSCEPTOR DISPERSED
IN MOLTEN JOINT

JOINT COOLED AND
CRYSTALLIZED

ABSORBABLE-SUSCEPTOR JOINING OF CERAMIC SURFACES

ORIGIN OF THE INVENTION

The invention described herein was made in the performance of work under a NASA contract and is subject to the provisions of Section 305 of the National Aeronautics and Space Act of 1958, Public Law 83-568 (72 Stat 435; 43 USC 2457).

TECHNICAL FIELD

This invention relates to the joining of ceramic surfaces and, more particularly, to a novel fusion method of forming a homogeneous joint between the surfaces.

BACKGROUND OF THE INVENTION

The fabrication of ceramic, high-temperature process equipment, such as heat exchangers, frequently requires the joining of complex subassemblies. These joints usually must be strong at high temperatures, vacuum or gas tight, and resistant to a variety of corrosive atmospheres. Moreover, although high reliability is required, cost is often an important factor.

These requirements usually exclude the cheaper methods of joining ceramics such as adhesives, cements, and pressed mechanical joints. Ceramic surfaces can also be joined by forming a heterogeneous joint such as by brazing with refractory metals or with ceramic brazes, such as glasses. Another kind of heterogeneous chemical bond is produced in the process disclosed in U.S. Pat. No. 4,050,956 by heating an abutting assembly of a ceramic oxide and a metal to a temperature below the melting point of any component of the assembly. However, because the brazing or bonding material has different properties than the ceramic itself, there are usually substantial limitations in service temperature, strength, and resistance to corrosive atmospheres. Welded joints, whether fabricated by solid-state diffusion or fusion, have superior high-temperature strength and corrosion resistance but are generally expensive and of limited application. Diffusion welding produces extremely strong, homogeneous bonded joints but vacuum tightness is difficult to obtain and unreliable. This technique is also slow, expensive, and somewhat limited with regard to the shapes that can be joined. Fusion welding can be accomplished by lasers, focused arcs, electron beams, and r.f. or gas torches, but in all cases the joint is shallow, limited to simple external configurations, and prone to thermal stress cracking. Therefore, none of the techniques currently used to join ceramics is completely satisfactory for forming gas-tight joints or joining complex surfaces at reasonable cost.

STATEMENT OF INVENTION

A novel method of joining ceramic surfaces is provided in accordance with the present invention that provides gas-tight joints that can survive high temperature and corrosive environments and can be utilized to join surfaces having complex configurations. The process of the invention is inexpensive and simple and provides very high reliability joints in a fast and convenient operation.

In the process of the invention a thin-film of absorbable metal susceptor is placed at the interface between the ceramic surfaces which are then abutted to form an assembly within an enclosure. The assembly is placed in an r.f. induction field. The susceptor is preferentially heated to a molten state at low frequency and the surfaces of the ceramic are heated by the susceptor. With some ceramic materials the ceramic will melt at some temperature below the melting point of the susceptor and both the susceptor and ceramic will then be heated by the applied r.f. field. In certain cases the molten susceptor is absorbed into the adjacent ceramic surfaces. In other embodiments an atmosphere reactive with the susceptor but not with the ceramic is then introduced into the enclosure while the surfaces are molten. The susceptor reacts with the atmosphere to form a compound which dissolves in the adjacent molten ceramic zones. Comparisons of the absorbable-susceptor method of the invention to other joining processes are provided in the following table.

As shown in Table I, the absorbable-susceptor method offers a combination of advantages not found in any other process. It should be comparable to fusion welding in strength, service temperature, environmental stability and vacuum tightness, but be better in speed, joint depth, and (because of its unidirectional thermal profile) resistant to thermal-stress cracking. It should be comparable to diffusion welding in joint depth, configurational complexity, and service temperaure, but much faster and more reliably vacuum tight. It should be comparable to brazing in joint depth and speed, but have a higher service temperature and be more resistant to corrosive environments. It is therefore potentially the optimum ceramic-joining technique for many energy-related applications such as heat exchangers and turbine rotor assemblies.

These and many other features and attendant advantages of the present invention will become apparent as the invention becomes better understood by reference to the following detailed description when considered in conjunction with the accompanying drawings.

TABLE 1

Comparison of the consumable-susceptor method with other techniques for joining ceramics (after R. W. Rice, Ref.)

| TYPE | ADHESIVE | CEMENT | MECHANICAL | BRAZING | SOLID-STATE DIFFUSION WELDING | FUSION WELDING | CONSUMABLE-SUSCEPTOR R. F. WELDING |
|---|---|---|---|---|---|---|---|
| STRENGTH (KPSI) | LOW (<5) | LOW (OFTEN <1) | LOW-MEDIUM (1-10) | GOOD (10-40) | VERY GOOD (20-60+) | GOOD (10-50) | GOOD |
| COMPATIBILITY WITH SEVERE ENVIRONMENTS | POOR | POOR-MEDIUM | POOR-MEDIUM | MEDIUM-GOOD | MEDIUM-GOOD | USUALLY BEST | = FUSION WELD |
| VACUUM | QUESTION- | USUALLY | USUALLY | USUALLY | FREQUENTLY | USUALLY | = FUSION |

TABLE 1-continued

Comparison of the consumable-susceptor method with other techniques for joining ceramics (after R. W. Rice, Ref.)

| TYPE | ADHESIVE | CEMENT | MECHANICAL | BRAZING | SOLID-STATE DIFFUSION WELDING | FUSION WELDING | CONSUMABLE-SUSCEPTOR R. F. WELDING |
|---|---|---|---|---|---|---|---|
| TIGHTNESS | ABLE | NOT | NOT | | BUT UNRELIABLE | | WELD |
| DEPTH OF JOINT | ANY | ANY | ANY | ANY | ANY, BUT JOINT FLATNESS, AND STRESS UNIFORMITY CRITICAL | SHALLOW (<1 cm) | ANY |
| COMPLEX OR MULTIPLE JOINTS | ANY | ANY | SOME | ANY | SOME, BUT ALIGNMENT CRITICAL | VERY LIMITED | ANY |
| SERVICE TEMPERATURE | VERY LOW | LOW | WELL BELOW TO NEAR M.P. | WELL BELOW M.P. | NEAR M.P. | NEAR M.P. | NEAR M.P. |
| THERMAL STRESS CRACKING | NONE | NONE | NONE | RARELY | NONE | SERIOUS PROBLEM | BETTER THAN FUSION WELD |
| TIME REQUIRED | SECONDS-HOURS | MINUTES-HOURS | MINUTES(?) | MINUTES | HOURS | MINUTES | SECONDS-MINUTES |
| COST | LOW | LOW | LOW-MEDIUM | MEDIUM-HIGH | MEDIUM-HIGH | MEDIUM-HIGH | LOW TO HIGH |

BRIEF DESCRIPTION OF THE DRAWINGS

FIG. 1 is a schematic view of a system for joining ceramic surfaces in accordance with the invention;

FIG. 2 is a perspective view of an assembly illustrating a special form of susceptor;

FIGS. 3(a) to 3(e) are a series of schematic views of the interface showing the stages of forming the joint under low frequency conditions.

DETAILED DESCRIPTION OF THE DRAWINGS

Figure 3C:
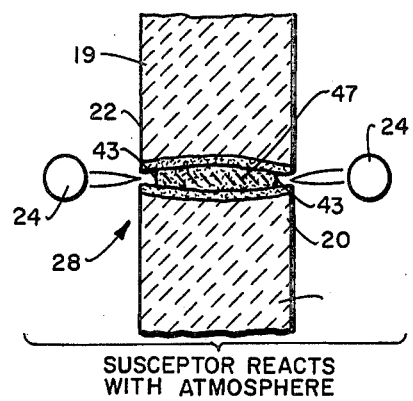

The method of the invention is generally applicable to ceramic materials and particularly to the refractory oxide and carbide ceramics. The ceramic must be capable of dissolving the susceptor or the reaction product of the susceptor and the reactive atmosphere. The susceptor can have a lower melting point than the adjacent ceramic. The final solution or phase formed at the joint interface should not have a substantially lower melting temperature than the host ceramic. Therefore, eutectic or solid-solution systems are useful only in cases where the melting point depression is not significant.

The ceramic oxide or carbide can be of metals of Groups II, III, IV and VIII of the Periodic Table including rare earth and actinide metals. Exemplary ceramic materials are the oxides or carbides of beryllium, magnesium, calcium, barium, aluminum, cerium, thorium, zirconium, titanium, tantalum, iron, cobalt, nickel and ruthenium.

The metal susceptor has a higher conductivity than the adjacent ceramic and the susceptor or its reaction product is soluble in the ceramic material. The susceptor M reacts with the reactive component X atmosphere to form a soluble compound MX. The susceptor can be absorbed into the ceramic joint by any of several methods depending on the characteristics of the ceramic-susceptor-atmosphere system. The susceptor M can be identical to the metal M' of the ceramic $M'_xC_y$ or $M'_xO_y$ so that the susceptor can be converted to the ceramic material to form a single phase joint which is the method of choice. An example is the use of zirconium to join zirconia surfaces.

Another example of a susceptor is a metal M which is different than $M'_xC_y$ or $M'_xO_y$ of the ceramic which can be reacted to form a compound $M_xC_y$, $M_xN_y$ or $M_xO_y$ or eutectic soluble in the ceramic and forming a stable solid solution with the ceramic. If chromium is used as a susceptor for melting alumina, it can then be reacted with oxygen to form $Cr_2O_3$, which dissolves in alumina to form a complete range of stable solid solutions, all of which have solidus temperatures equal to or higher than pure alumina. Therefore, the resulting joint should have a usable service temperature comparable to that of pure alumina. Similarly, tantalum can be used as a susceptor for joining niobium carbide and can then be converted to the carbide, by reaction with methane, and dissolved in the molten NbC to form a solid solution with an even higher melting point than NbC itself. Most solid solution systems, however, have solidus temperatures well below the melting point of the pure ceramic and would therefore entail some loss of service temperature.

In some cases, the susceptor material can directly dissolve in the ceramic to form a stable end product. Thus, titanium and tantalum dissolve in their carbides to form limited solid solutions. An even more interesting possibility is the use of a carbon susceptor for heating magnesia. It has recently been shown that carbon dissolves appreciably in molten and submolten magnesia. Therefore, even without an oxidizing atmosphere, the carbon susceptor might dissolve into the molten joint zone of the magnesia and remain after solidification as dissolved atomic carbon, which could be removed by subsequent annealing in oxygen. This method might well be preferable to direct oxidation of the carbon susceptor, which would probably result in bubble formation in the molten MgO.

If tantalum is used to join TaC parts with insufficient diffusion after melting, or use of excessive carbonizing, the resultant joint will be a $TaC-Ta_2C$ eutectic or a TaC-C eutectic instead of a $TaC_{1-x}$ solid solution. Similarly, a yttrium susceptor used to heat alumina and then oxidized would result in a $Al_2O_3-Al_5Y_3O_{12}$ eutectic joint similar to those formed by brazing alumina with $Al_2O_3$-$Y_2O_3$ eutectic. Here the only advantage, if any, would be the ease and speed with which the joint could be heated to the reaction temperature. In general, however, since eutectic formation always entails a loss of service temperature, it is usually the least satisfactory method of absorbing the susceptor.

The apparatus to be utilized depends on the susceptor-ceramic system and the size and/or shape of the parts to be joined. The r.f. field is usually provided by a coil which can be in the horizontal or vertical planes or at various angles to the plane of the joint assembly. The coil is preferably a concentrator type of coil. In the simplest case changing of atmospheres is not necessary. The assembly of ceramic and susceptor is placed inside a non-suscepting tube such as glass surrounded by a coil. A susceptor such as zirconium in a high frequency r.f. field with react with oxygen in the ambient air to form zirconia slowly enough to melt the adjacent zirconia surfaces. When all the zirconium is converted, the assembly is cooled to form a homogeneous joint. A more detailed apparatus capable of exchanging atmospheres is shown in FIG. 1.

Referring to FIG. 1, an apparatus for joining ceramic surfaces, according to the invention, can include a chamber 10 surrounded by an enclosure 12 having a hinged door 14 for insertion and removal of ceramic parts. The enclosure can have sealed ports for receiving large ceramic assemblies such as tubes or rods. The chamber 10 contains a pair of clamps such as a fixed clamp 16 and a translatable chuck 18 for holding a thin sheet 22 of susceptor between two pieces of ceramic material 19, 20. An r.f. induction coil 24 connected to a variable frequency power supply 26 surrounds the joint assembly 28 and can be disposed within the chamber 10 or outside of the enclosure. Auxiliary heaters can also be utilized within or without the chamber or as separate units to preheat the assembly or to anneal the assembly after forming the joint.

Provision for controlling the gas atmosphere of the chamber 10 comprises a gas inlet 30 joined to a gas manifold 31 which is connected to a vacuum pump 39 and a regulated source 36 of inert gas and a regulated source 38 of reactive gas by means of valves 32 and 34.

The system is operated by opening door 14 and inserting ceramic piece 19 into fixed clamp 16 and ceramic piece 20 into chuck 18. The chuck 18 is moved to clamp the sheet of susceptor 22 between the pieces to form a joint assembly 28. The door 14 is closed to form a gas-tight chamber. Vacuum pump 39 is operated to remove ambient gas from the chamber 10. An inert gas from supply source 36 can then be fed to the chamber. Power supply 26 is tuned to the desired frequency and output setting and is turned on to actuate inductance coil 24. The susceptor and the adjacent zones 40, 42 or the ceramic pieces melt. The atmosphere in the chamber 10 is then exchanged with reactive gas from gas source 38 to react with the susceptor to form a compound which disperses in the zones 40, 42 to form a homogeneous joint or solution of susceptor compound.

Referring now to FIG. 2, during formation of a large diameter joint 50, the outer rim 52 of the susceptor 54 may shield the inner region from the r.f. field, thereby causing non-uniform heating. This can be compensated for by providing small perforations 56 in the outer part of the susceptor. Conversely, perforations 58 in the inner region of the susceptor can compensate for radiative heat loss from the rim 52 or the susceptor. A similar effect can be achieved by other configurations such as multi-reentrant loops and spirals.

Figure 3D:
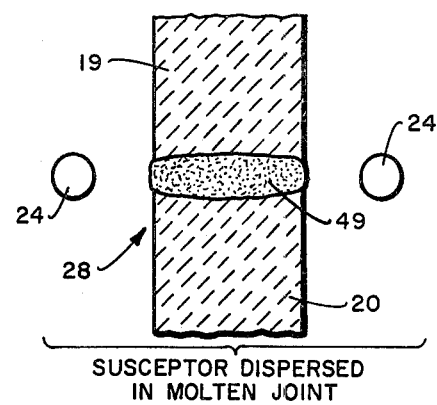
Figure 3E:
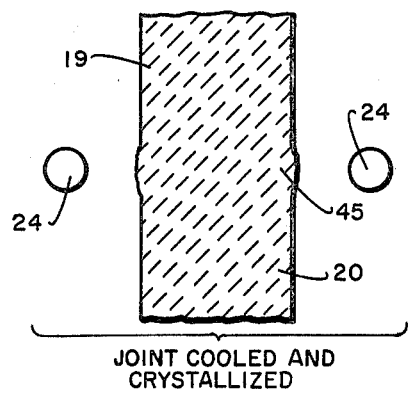

The progressive sequence of events for a low-frequency mode of operation for a homogeneous susceptor-case is illustrated in FIG. 3. In the low frequency mode of operation there is no substantial heating of the ceramic up to its melting point. A thin film or sheet 22 of high-electrical-conductivity susceptor material, such as a refractory metal, is placed between the ceramic surfaces 21, 23 to be joined. This sandwich assembly 28 is inserted into an r.f. induction coil 24 which can be mounted in a chamber with provision for changing the atmosphere surrounding the ceramic-susceptor assembly (FIG. 3a). Initially, the atmosphere will be either vacuum or inert gas. When the power is turned on, the susceptor, having a higher electrical conductivity than the ceramic, will be preferentially heated until it begins to melt the adjacent ceramic surfaces (FIG. 3b). When the adjacent zones 40, 42 of molten ceramic are sufficiently thick to insure subsequent joining, the susceptor is transformed by adding a reactive component x to the surrounding atmosphere so that the susceptor M reacts with it. Initially a crust 43 of molten ceramic MX forms surrounding a core 47 of susceptor M. Eventually all the susceptor is reacted to form a ceramic material 49 which is cooled to form a solid joint 45 (FIG. 3e). For example, a zirconium foil susceptor, sandwiched between two pieces of zirconia, would first be induction-heated until a molten layer formed on both zirconia surfaces; then oxygen would be added to the atmosphere so that the zirconium foil reacted exothermically to form zirconia which would dissolve in the surrounding molten zirconia. When cooled, the resultant joint would be composed of pure ceramic and would have the service temperature and impermeability of a welded joint (FIG. 3e). A low frequency r.f. source is also desirable when joining pieces of carbide since their electrical conductivity is usually not much less than that of the corresponding metal susceptor. A low frequency r.f. source keeps the melting concentrated at the joint interface.

Referring now to FIG. 4, when high frequency radiation, usually above 1 mhz, from the coil 24 is applied to the assembly 28, the sheet 22 of susceptor will initially suscept and heat. At some temperature above the melting temperature of the susceptor but below the melting temperature of the ceramic, the adjacent ceramic surfaces will also suscept, heat, and melt to form narrow molten zones 70, 72 (FIG. 4b). The melting will continue as long as the r.f. field is applied to the assembly. This provides the ability to melt ceramics having a higher melting point than the susceptor and also provides additional process control. However, the molten zones 60, 62 are usually wider as shown in FIG. 4c and the resultant joint is thicker.

Figure 4A:
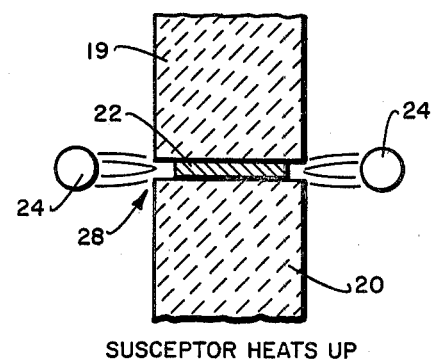
FIGS. 4(a) to 4(e) are a series of schematic views of the interface showing the stages of forming the joint under high frequency conditions.
Figure 4B:
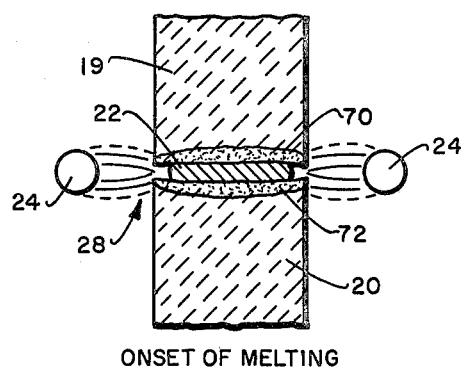
Figure 4C:
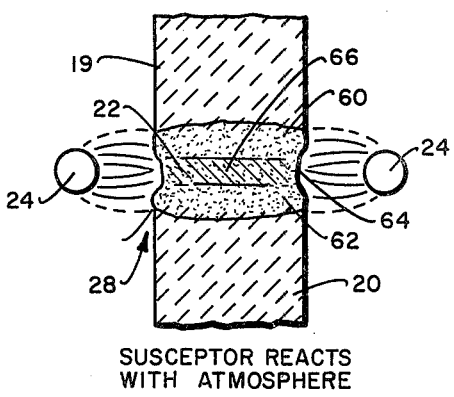
Figure 4D:
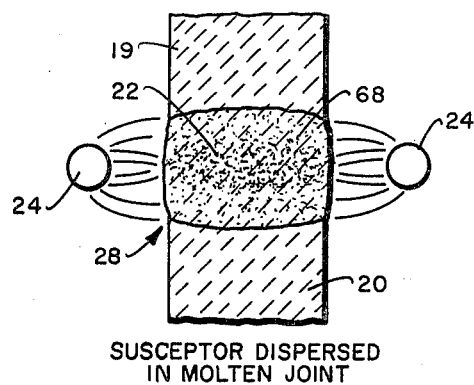
Figure 4E:
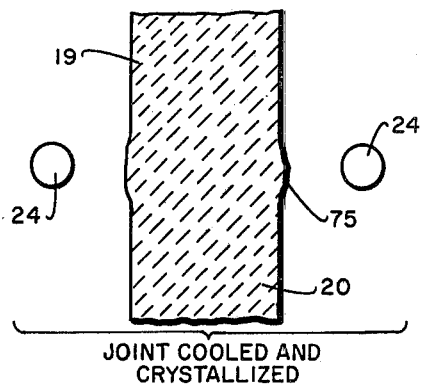

When the atmosphere is changed to a reactive atmosphere (FIG. 4c) the susceptor M reacts with the atmosphere to form a crust 64 of MX surrounding a core 66 of unreacted metal. When all the susceptor is converted it disperses in the adjacent molten zones 70, 72 (FIG. 4d) forming a larger molten dispersion zone 68 than in the low frequency coil. Removal of the r.f. field allows the joint to cool and the ceramic and dispersed compound to assume a crystalline structure 75 (FIG. 4e).

On of the major advantages of absorbable-susceptor welding is the many process variables which permit optimization of the process for any specific ceramic or application. These variables include choice of susceptor material, thickness, and degree of perforation, choice of r.f. frequency, spatial distribution, and power-vs.-time profile, choice of type and concentration-vs.-time profile of reactive atmosphere, and the option of using auxiliary heaters. Individually or by mutual interaction, these variables determine the composition, grain size, thickness, and uniformity of the weld joint, as well as the speed of the overall process. Although the interactions are in some cases complex, the general effect of each variable is as follows:

As previously discussed above, the choice of susceptor material and reactive atmosphere for any given ceramic determines the phase composition of the joint. In addition, the grain size of the joint can in some cases be refined by adding nucleating agents to the susceptor. For example, the addition of small amounts of from 0.1 to 10% by weight magnesium or silicon to the susceptor will probably reduce the grain size of an alumina joint. It should be noted that the choice of susceptor material is by no means confined to materials with melting points above that of the ceramic to be joined. Provided that the vapor pressure is low enough, a molten susceptor can be used and may even be advantageous with regard to uniformity of heating and rapidity of reaction with the reactive atmosphere. Thus, aluminum should not be excluded from consideration as a susceptor for joining alumina since the result would be a homogeneous alumina joint.

In general, the thinnest possible susceptor is preferable, since it would result in a thinner, more dimensionally stable joint. The minimum feasible thickness, however, will be a function of the frequency and power of the r.f. field. Thicknesses of from 0.1 to 1.0 mm are suitable.

The frequency of the r.f. radiation can be an important variable in the joining of certain oxides such as zirconia. Low frequency radiation is considered to be from 1 to 1000 khz and high frequency radiation from 1 to 1000 mhz. If a low-frequency (450 khz) r.f. field is used, the r.f. field will heat the susceptor exclusively and the ceramic surfaces will be heated solely by contact with the susceptor. Therefore, when the susceptor is oxidized by the reactive atmosphere (FIG. 3c) all r.f. heating will be stopped and the joint will cool automatically. On the other hand, if a high-frequency (5 mhz) r.f. field is used, the heated and molten ceramic will also suscept and will continue to be heated by the r.f. field until the power is turned off (FIG. 4). This effect, which has been used to initiate the skull melting of ceramics for crystal growth, thus provides an additional mode of process control but will probably lead to a thicker joint.

The configuration of the r.f. coil will affect both the degree of concentration and the uniformity of heating at the joint. It is therefore an important variable that can be optimized for each specific joint geometry. In heating the joint, it is desirable to use the highest power density consistent with the thermal-stress limits of the ceramic. This does not appear to impose any limits in the case of unidirectional geometries, such as butt joints of tubes or rods, but more complex geometries, such as tapered sleeve joints, may require careful tailoring of the power-vs.-time cycle.

The composition of the reactive atmosphere will be determined by the reaction product desired. For the sake of speed and completeness of reaction, the highest possible reactant concentration is desired but limitations may be imposed by reaction equilibria. For example, in joining tantalum carbide parts by means of a tantalum susceptor, too high a concentration of a carbonizing gas may force the reaction over to formation of free carbon and of a TaC-C eutectic joint. Another consideration is the possibility of r.f. arcing, which may limit the allowable pressure of reactive gas and also of the inert gas initially used. The reactive gas atmosphere may contain an oxidizing gas such as oxygen, a carbonizing gas such as methane, a nitriding gas such as nitrogen or a sulfiding gas. The reaction is preferable to a compound having an anion identical to the host ceramic such as an oxide, a carbide, nitride or sulfide.

For materials or geometries in which the thermal stress cracking is a serious problem, it may be desirable to preheat the assembly before applying the r.f. field. This would entail inserting the concentrator coil within a furnace or sandwiching it between two furnaces. Such configurations have been developed for other processes.

In conclusion, the many variables inherent in the absorbable-susceptor welding process make it adaptable to a wide variety of ceramics and joint configurations.

It is to be realized that only preferred embodiments of the invention have been described and that numerous substitutions, modifications and alterations are permissible without departing from the spirit and scope of the invention as defined in the following claims.

We claim:

1. A method of joining ceramic surfaces comprising the steps of:
   placing a thin film of metal susceptor material at the interface between the surfaces to form an abutting assembly, said metal being reactive with a gas to form a compound soluble in the ceramic;
   melting the film and adjacent zones of ceramic;
   reacting the susceptor with a gas to form said compound;
   dissolving said compound in the molten ceramic; and
   cooling the assembly to form a joint.

2. A method according to claim 1 in which the film is heated by applying radio frequency radiation to the assembly.

3. A method according to claim 2 in which the radiator has a low frequency below 1000 khz and only the susceptor film initially melts.

4. A method according to claim 2 in which the radiation has a high frequency above 1 mhz and the susceptor film and adjacent zones initially melt.

5. A method according to claim 2 in which the ceramic is an oxide or carbide of a metal of Groups II, III, IV and VIII of the Periodic Table.

6. A method according to claim 5 in which the ceramic is an oxide or carbide of beryllum, magnesium, calcium, barium, aluminum, cerium, thorium, zirconium, titanium, tantalum, iron, cobalt, nickel and ruthenium.

7. A method according to claim 6 in which the reactive gas is selected from an oxidizing, carbonizing, nitriding or sulfiding gas.

8. A method according to claim 2 in which the compound is identical to the ceramic.

9. A method according to claim 8 in which the ceramic is a metal oxide and the gas is oxygen.

10. A method according to claim 8 in which the ceramic is a metal carbide and the gas is a carbonizing gas.

11. A method according to claim 8 in which the ceramic is a metal nitride and the gas is a nitriding gas.

12. A method according to claim 8 in which the ceramic is a metal sulfide and the gas is a sulfiding gas.

13. A method according to claim 1 in which the susceptor film is perforated.

14. An apparatus for joining ceramic surfaces comprising:
enclosure means for forming a gas-tight chamber;
clamping means disposed within said chambers for holding an assembly of ceramic surfaces with a sheet of metal susceptor therebetween;
first inert gas supply means connected to the chamber;
second reactive gas supply means connected to the chamber; and
induction heating means for heating said assembly.

* * * * *